(12) United States Patent
Elliott

(10) Patent No.: US 7,158,790 B1
(45) Date of Patent: Jan. 2, 2007

(54) DETERMINING SERVICE COVERAGE FOR METROPOLITAN WIRELESS NETWORKS

(75) Inventor: Brig Barnum Elliott, Arlington, MA (US)

(73) Assignees: Verizon Corporate Services Group Inc., New York, NY (US); BBN Technologies Corp., Cambridge, MA (US)

( * ) Notice: Subject to any disclaimer, the term of this patent is extended or adjusted under 35 U.S.C. 154(b) by 545 days.

(21) Appl. No.: 10/196,619

(22) Filed: Jul. 16, 2002

(51) Int. Cl.
*H04Q 7/20* (2006.01)

(52) U.S. Cl. .................. 455/446; 455/456.1; 455/457; 455/67.11; 455/67.13; 455/67.7

(58) Field of Classification Search ................ 455/446, 455/456.1, 457, 67.11, 67.13, 67.7
See application file for complete search history.

(56) References Cited

U.S. PATENT DOCUMENTS

| | | | | |
|---|---|---|---|---|
| 5,267,261 A | * | 11/1993 | Blakeney et al. | ........... 370/332 |
| 5,701,585 A | * | 12/1997 | Kallin et al. | ................. 455/437 |
| 5,724,660 A | * | 3/1998 | Kauser et al. | ........... 455/456.2 |
| 6,266,514 B1 | * | 7/2001 | O'Donnell | ............... 455/67.13 |
| 6,336,035 B1 | * | 1/2002 | Somoza et al. | ............. 455/446 |
| 6,728,228 B1 | * | 4/2004 | Ostman et al. | ............. 370/332 |
| 6,745,011 B1 | * | 6/2004 | Hendrickson et al. | ... 455/67.11 |

* cited by examiner

*Primary Examiner*—Matthew Anderson
*Assistant Examiner*—Minh Dao

(57) ABSTRACT

A method is provided for determining service coverage for a wireless network using information indicating quality of service coverage for the wireless network, wherein the information is determined using wireless devices in conjunction with the wireless network. When the wireless device is coupled through an access point to the wireless network using a wireless communication channel, information indicating quality of service coverage for the wireless network may be received from the wireless device and gathered in a database. The quality of service coverage for the wireless network may then be monitored using the information in the database.

25 Claims, 6 Drawing Sheets

DETERMINING SERVICE COVERAGE FOR METROPOLITAN WIRELESS NETWORKS

DESCRIPTION OF THE INVENTION

1. Field of the Invention

The present invention relates to wireless network systems in general, and to methods and systems for providing wireless network access in metropolitan areas in particular.

2. Background of the Invention

Traditionally, wireless network service providers in metropolitan areas predict service coverage provided by a wireless network infrastructure using radio frequency (RF) simulations based on the city topography. After the wireless network infrastructure is established, RF measuring equipment may be installed in vehicles that drive through the service area and determine the actual service coverage of the wireless network. When the network service provider determines that the service coverage of the wireless network is sufficient, the wireless network may be made available for use by customers.

Conventional methods for developing wireless networks and determining actual service coverage suffer from several shortcomings. For example, simulations based on the topography of buildings in a metropolitan area may not predict changes in service coverage that result when new buildings are constructed, or changes in service coverage that may result from seasonal variations that obstruct a line-of-sight between wireless devices used to access the wireless network and access points of the wireless network. Thus, the service coverage must be verified by making periodic measurements throughout the wireless network service area to determine the actual service coverage.

The expression "wireless device" as used herein includes both portable and non-portable devices that may be communicatively coupled to a wireless network. Exemplary wireless devices include portable devices such as cellular telephones, radio communication systems, wireless Internet computers, wireless modems, and pager devices. The expression "wireless device" also includes devices that communicate by optical or infrared signals, such as Bluetooth devices, and should not be construed as limited to devices that communicate by means of RF signals. Moreover, the expression "wireless device" includes repeater devices, as well as free space microwave and optical communication links.

A significant portion of the service area where customers typically use wireless devices in a metropolitan region may be inaccessible to the measurement vehicles. For example, the measurement vehicles may not determine service coverage inside structures, such as office buildings, shopping malls, public transit systems, and other areas where people frequently use wireless devices. Measurements taken outside of the structure may not accurately indicate quality of service coverage provided inside the structure.

Also, the information provided by the measurement vehicles depends on local RF propagation phenomena specific to where and when the service coverage is measured. For example, the quality of service coverage and excess capacity of the wireless network may vary significantly according to the time of day, day of the week, and in response to unusual demand. Measurements of the service coverage and the excess capacity of the wireless network at one time may not accurately reflect the service coverage and excess capacity provided at another time due to changes in demand for wireless network service and geographic distribution of customers. For example, a measurement of network service coverage within a public transit system during the day or evening may not accurately reflect the service coverage and excess capacity during peak commuting hours.

Furthermore, even if conventional measurement techniques may provide an accurate estimate of service network coverage of the wireless network, the average service coverage does not indicate service coverage during periods of unusual demand. For example, a service provider may desire to provide additional network capacity to enable effective communication between police officers, fire departments, and other public service organizations during an emergency. Even if a wireless network provides adequate service coverage during typical usage, the wireless network may be overwhelmed during an emergency. Conventional methods for measuring network coverage do not permit real-time measurement of the actual service coverage provided. Consequently, conventional systems may not provide information needed to dynamically allocate capacity according to actual demand for service coverage during the crisis.

Additionally, conventional systems generally make continuous measurements at access points, such as by measuring the RF signal strength of cellular telephones at the cellular base stations, when the wireless device communicates with the access point to the wireless network. In general, measurements are only provided when the wireless device successfully establishes a communication channel through the access point. Consequently, conventional systems may not determine where "dead zones" may exist within the service coverage of the wireless network.

SUMMARY OF THE INVENTION

The present invention provides a system for improving the service coverage of wireless networks. This is achieved by making measurements of the service coverage of the wireless network using actual wireless devices that access the wireless network. The wireless devices may measure quality of service coverage provided by the wireless network, and report the service coverage through the wireless network infrastructure to a processor. Service coverage reports may be gathered to establish a database of service coverage reports for the wireless network. The processor may then generate a report showing service coverage of the wireless network.

Methods and systems are provided that leverage the power of a wireless communication network, such as a cellular telephone system, to gather information indicating quality of service coverage provided by the wireless network. A service provider for the wireless network may determine the service coverage provided without deploying specialized equipment because the information may be gathered from actual wireless devices coupled to the wireless network. Also, a service provider may determine actual service coverage of the wireless network in real-time according to actual demand for service, as opposed to estimating the service coverage from measurements determined at other times and locations. Consequently, a service provider may eliminate "dead zones" in the service coverage. Moreover, the service provider may determine how to allocate network resources to enable effective communication during an emergency.

Methods and systems consistent with one aspect of the present invention may enable determining service coverage for a wireless network having a plurality of access points, comprising receiving information indicating a quality of service, wherein said information is received from at least one wireless device that is communicatively coupled through at least one of said plurality of access points to the wireless network using a wireless communication channel; gathering the received information in a database; and monitoring quality of service for the wireless network using the gathered information.

Methods and systems consistent with another aspect of the present invention may enable reporting service coverage for a wireless network having a plurality of access points, comprising determining first information indicating a quality of service, wherein said first information is transmitted by at least one wireless device communicatively coupled to the wireless network through at least one of said plurality of access points using a wireless communication channel.

Methods and systems consistent with yet another aspect of the invention may enable determining service coverage for a wireless network having a plurality of access points, the system comprising means for receiving information indicating a quality of service, wherein the received information is received from at least one wireless device that is communicatively coupled through at least one of said plurality of access points to the wireless network using a wireless communication channel; means for gathering said received information in a database; and means for monitoring quality of service for the wireless network using the gathered information.

An apparatus consistent with one aspect of the invention may provide for reporting service coverage for a wireless network having a plurality of access points, said apparatus comprising means for determining information indicating a quality of service, wherein the determined information is transmitted by at least one wireless device that is communicatively coupled through at least one of said plurality of access points to the wireless network using a wireless communication channel.

A device consistent with another aspect of the invention may comprise a transceiver; means for determining position information for the device at a plurality of time increments; means for determining quality of service information associated with the device at certain of said time increments and associating the quality of service with position information for the device at each of said time increments; and means for providing information reflecting the quality of service information to a base station based upon a condition.

A device consistent with still another aspect of the invention may provide for operation in a wireless network, comprising means for simultaneously determining position information for the device and quality of service information associated therewith within a network; and means for providing the quality of service information to a work station based on a condition.

Additional aspects of the invention will be set forth in part in the description which follows, and in part will be obvious from the description, or may be learned by practice of the invention. Features of the invention will be realized and attained by means of the elements and combinations particularly pointed out in the appended claims. It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Systems and methods consistent with the present invention enable a service provider to gather quality of service information from actual user devices. A customer may establish a wireless connection to an access point for the wireless network using a wireless device that may also monitor the quality of service for the wireless connection. If the quality of service for the wireless connection drops below a predetermined threshold, then the wireless device may store information about the quality of service, such as the location of the wireless device, in a memory therein. When the wireless device establishes another connection to the wireless network, the wireless device may transmit the recorded information to the wireless network. The service provider may then use their transmitted information to determine where "dead zones" exist within the service area.

For example, a customer may access a cellular telephone network using a wireless device such as a cellular telephone. The customer may establish a wireless connection location through a cellular base station by calling a telephone number. The established connection may be broken if the customer moves to another location that results in an inadequate quality of service such as, for example, when the customer enters a subway station. The cellular telephone may record information used to identify the location such as, for example, GPS coordinates for the location. When the customer establishes another wireless connection, the wireless device may transmit the recorded information to the network. The service provider may use the transmitted information to determine the locations where the quality of service is inadequate such as, for example, by overlaying the GPS coordinates associated with the cellular telephone over a geographic map of the cellular provider's coverage area.

Figure 1:
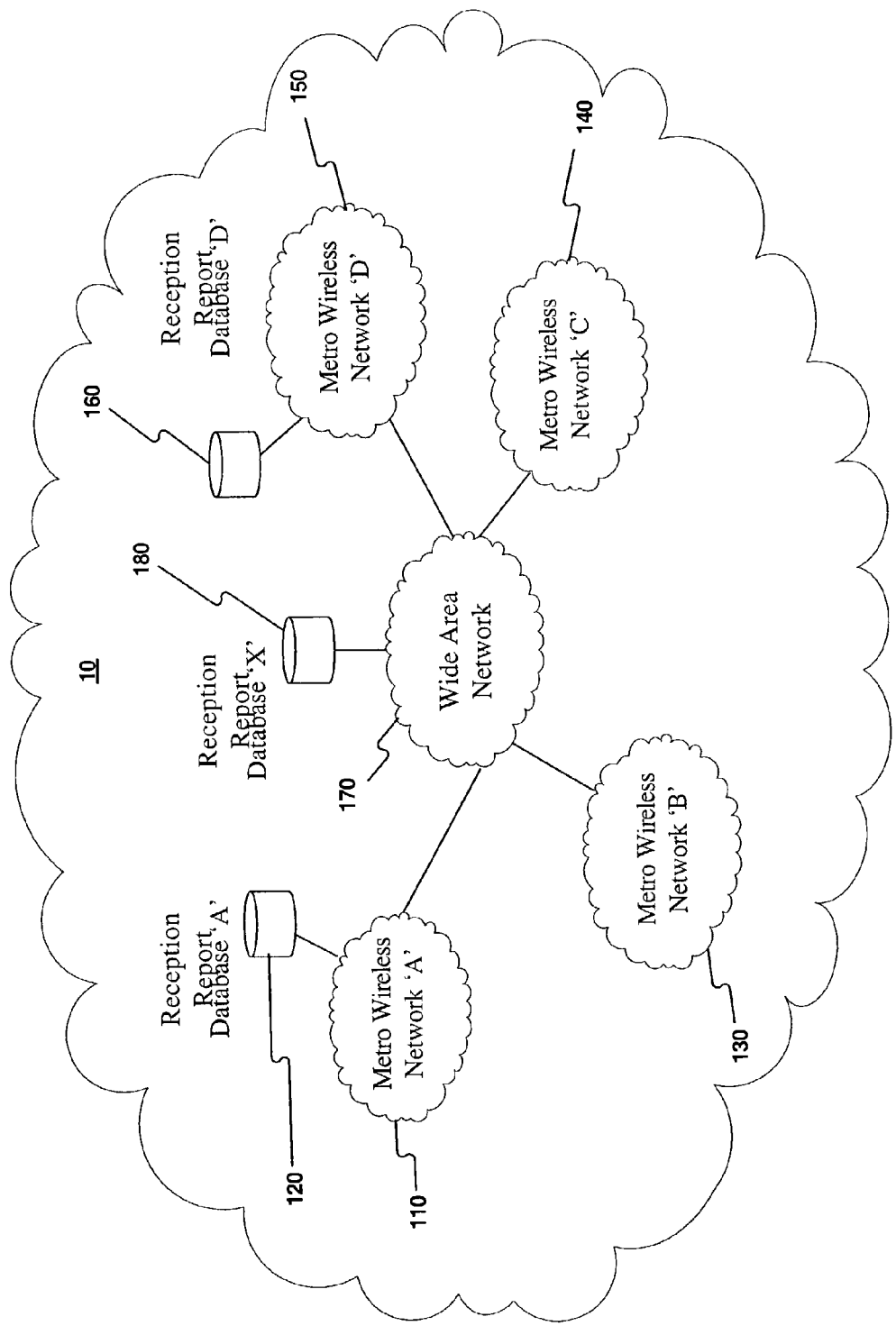
FIG. 1 is a general block diagram of an exemplary metropolitan wireless network in which methods and systems consistent with certain aspects related to the present invention may be implemented.

FIG. 1 shows a general block diagram of an exemplary metropolitan wireless network 10 in which methods and systems consistent with the present invention may be implemented. Network 10 includes a wireless network 110 coupled to other wireless networks 130, 140, 150 through a wide area network 170. For example, wireless network 110 corresponding to a first service area may be interconnected with wireless networks corresponding to other service areas 130, 140, 150 through a wide area network 170 such as a long-haul, wide-area backbone network. Each wireless network 110 may maintain a database 120 of reception reports for the corresponding service area. For example, wide area network 170 may maintain a database 180 of reception reports corresponding to one or more wireless network service areas 110, 130, 140 and 150. Alternatively, reception reports corresponding to metropolitan wireless network 130 may be maintained in a database 120 at another metropolitan wireless network 110. Databases used in conjunction with wireless networks may be co-located proximate to a given wireless network, or, alternatively they may be located remotely and coupled to wireless networks using communication media such as coaxial cable, optical fiber, microwave links, etc.

For yet another example, databases 120 and 160 corresponding to multiple wireless network service areas 110, 150 may be established at a plurality of geographic locations using a "web farm" to maintain the databases. "Web farm" as used herein may be implemented using a plurality of database server computers, logic for distributing requests to access the database among the server computers, and logic for reconciling changes to the database across the server computers. Web farm systems consistent with the present invention are commercially available from various vendors including, for example, CISCO SYSTEMS™, IBM™, EXODUS™, EXTREME NETWORKS™, and MICROSOFT™. A web farm with geographically distributed server computers may be used to enhance reliability by providing access to the database when a server computer in one area becomes inaccessible such as may result, for example, during a power outage or an interruption in network service.

Figure 2:
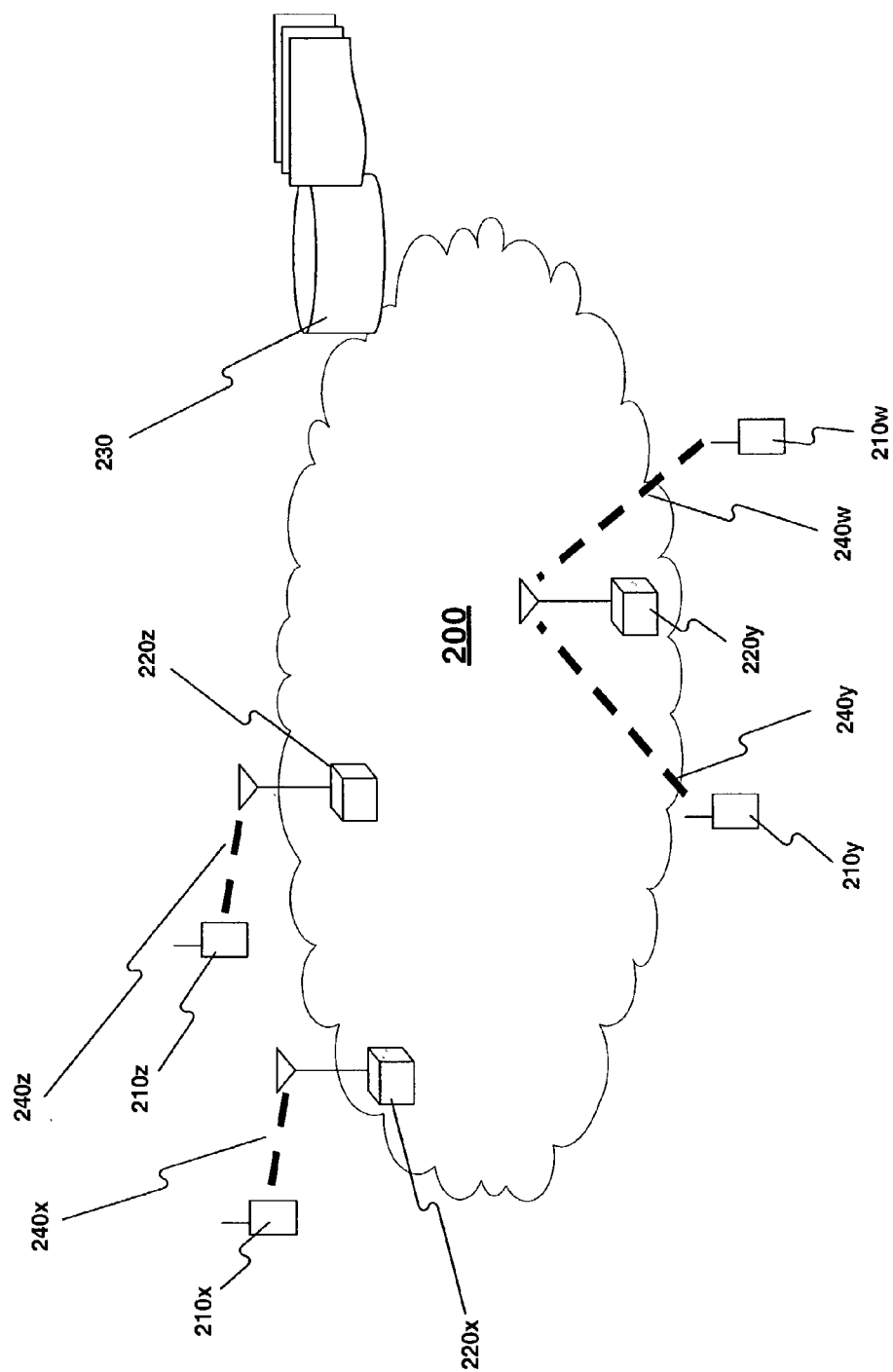
FIG. 2 shows an exemplary metropolitan wireless network topology in which methods and systems consistent with certain aspects related to the present invention may be implemented.

FIG. 2 shows an exemplary metropolitan wireless network topology in which methods and systems consistent with the present invention may be implemented. Wireless network 200 may include one or more wireless devices 210 w–z each coupled by a wireless communication link 240 w–z, respectively, such as, for example, radio or optical links to access points 220 x–z. Access points 220 may be located at fixed positions such as in cellular towers, on the tops of buildings, or on light-poles, or, alternatively they may be mounted on mobile vehicles or the like. Access points 220 may be coupled by wireline communication means (not shown) such as, for example, fiber optic or twisted pair communication lines, or they may be coupled by wireless communication means such as, for example, microwave or local multipoint distribution system (LMDS) communications. Moreover, access points 220 may be coupled by any combination of wireline and wireless communications.

Each wireless device 210 may transmit or receive messages through wireless network 200. For example, wireless device 210x may transmit a message to a corresponding access point 220x, which in turn routes the message to an edge router (not shown) that couples wireless network 200 to an external network such as the Internet. Messages sent from wireless device 210 may include information regarding quality of service coverage provided by the wireless access point 220 to the corresponding wireless device 210. For example, wireless device 210 may transmit a message to access point 220 that includes a received signal strength indication (RSSI) for the signal used to establish a wireless communication channel between wireless device 210 and access point 220. This message may include information identifying one or more access points 220 and the corresponding quality of signals available to wireless device 210.

In the alternative, wireless device 210y may transmit a message to one access point 220y regarding a different access point 220x with which wireless device 210y had previously established a communication channel. The message sent to access point 220y may indicate, for example, that the communication channel was lost when wireless device 210y entered a "dead zone," i.e. an area without service coverage. In general, each access point 220 may receive messages regarding service coverage from one or more wireless devices at one time (e.g., wireless devices 210w and 210y). The messages may be gathered to establish a database 230 of information regarding service coverage within wireless network 200.

Figure 3:
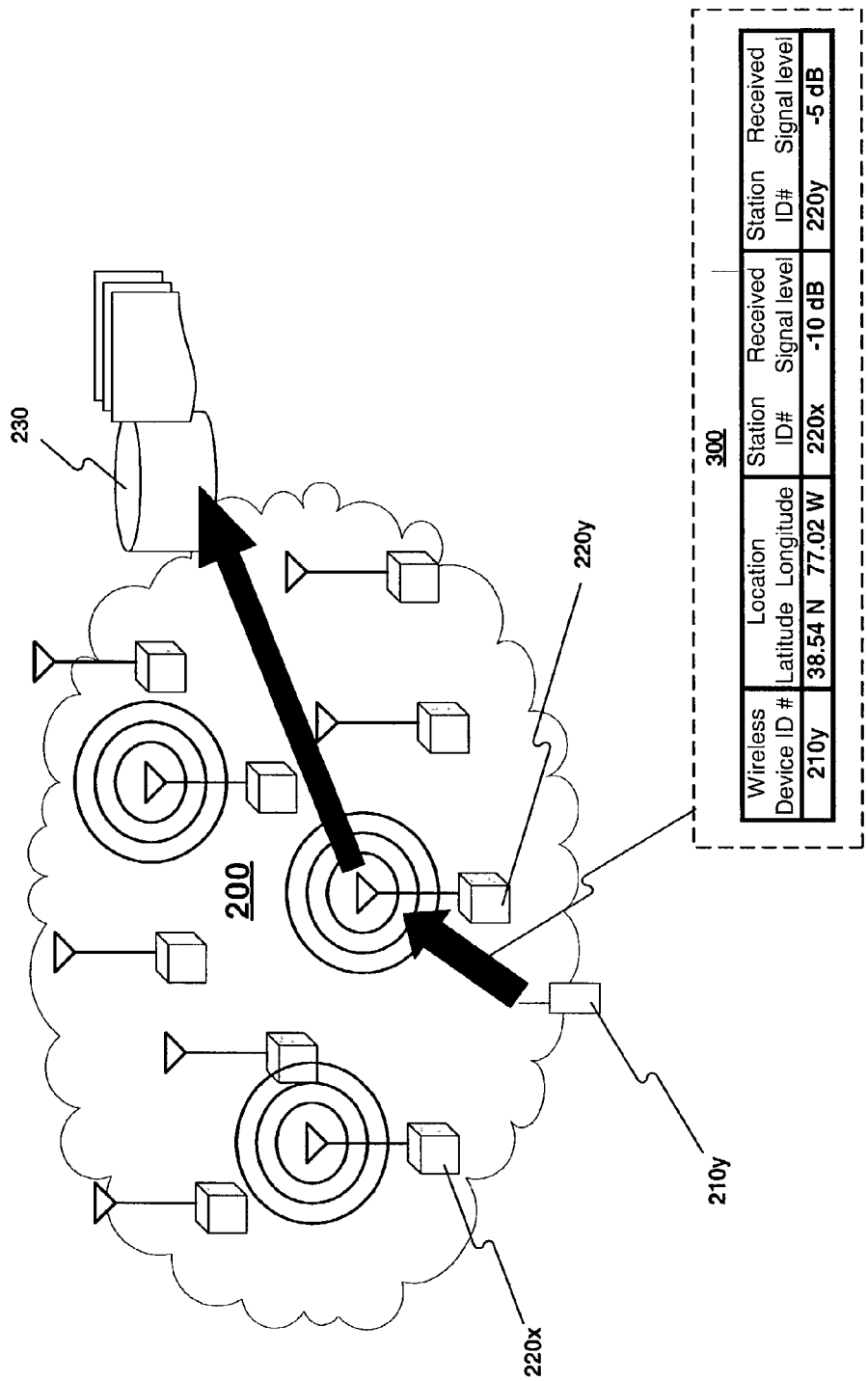
FIG. 3 shows an example of obtaining a reception report regarding service coverage of the wireless network in accordance with methods and system consistent with certain aspects related to the present invention.

FIG. 3 illustrates how an access point obtains a reception report regarding service coverage of the wireless network in accordance with methods and systems consistent with the present invention. Wireless device 210y may transmit a message 300 to access point 220y through a communication channel established over the wireless network 200. Message 300 may identify one or more access points 220x, 220y detected by wireless device 210y, and may further indicate the corresponding signal quality for each access point 220x, 220y identified. For example, wireless device 210y may transmit message 300 indicating that it has detected two cellular towers 220x and 220y, and may further indicate the corresponding strengths of signals received from each cellular tower 220x, 220y. Message 300 may also include information regarding the location of the wireless device 210y. For example, wireless device 220y may include a Global Positioning System (GPS) receiver to determine its position, or location of device 210y may be determined by triangulation or passive ranging techniques known in the art.

Access point 220y may send message 300 to a processor (not shown) which stores a record including the information from the message in a database 230. Communication between access point 220y and the processor may be implemented without limitation to a particular wireline or wireless network protocol. For example, access point 220y and the processor may communicate using the Asynchronous Transfer Mode (ATM), Integrated Services Digital Network (ISDN), Internet Protocol (IP), Transmission Control Protocol (TCP), User Datagram Protocol (UDP), Simple Network Management Protocol (SNMP), Common Object Request Broker Architecture (CORBA), or another protocol as desired.

Figure 4:
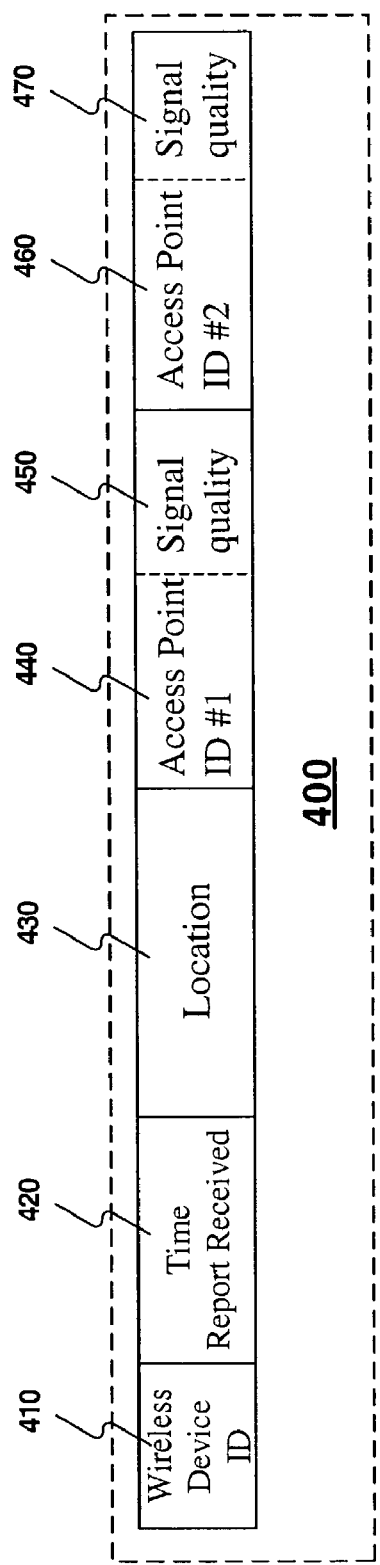
FIG. 4 shows an exemplary database entry for a reception report in accordance with methods and systems consistent with certain aspects related to the present invention.

FIG. 4 shows an exemplary database record 400, for example, for a reception report in accordance with methods and systems consistent with the present invention. Each record may include information identifying wireless device 410 which sent message 300; information identifying a time 420 when message 300 was received by access point 220y; information identifying a location 430 of the wireless device associated with the message where the service coverage was measured; information identifying one or more access points 440 and 460; and information identifying quality of the service coverage 450 and 470 corresponding to each of the identified access points 440 and 460.

Record 400 may combine information transmitted by the identified wireless device 410 and information determined at one of the identified access points 440 and 460. For example, it may not be necessary for the identified wireless device 410 to transmit the time 420 because the time 420 may be determined by equipment located at the identified access point 440. For another example, it may not be necessary to incorporate a GPS receiver into each wireless device 410 because the location 430 of the wireless device 410 may be determined by equipment located at the identified access point 440. For yet another example, the information identifying the wireless device 410 and the location 430 of the wireless device 410 may be included to facilitate troubleshooting the wireless network 200, but are not required to determine the service coverage.

Figure 5:
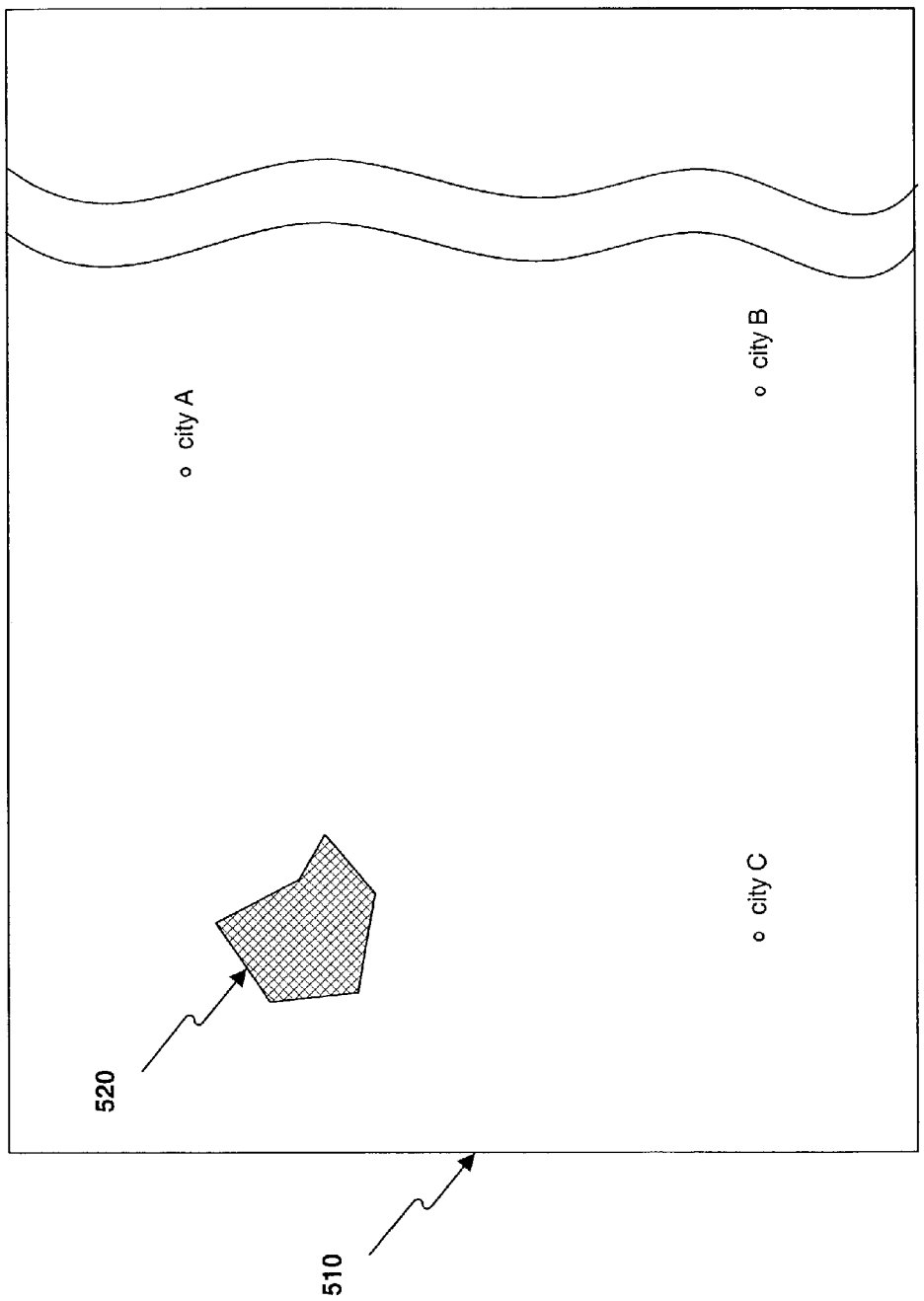
FIG. 5 shows an exemplary reception report in accordance with methods and systems consistent with certain aspects related to the present invention.

FIG. 5 shows an exemplary display containing a reception report in accordance with methods and systems consistent with the present invention. A general purpose computer, such as a work station (not shown) may access database 230 to generate a map report 510 illustrating the signal quality 450 of each access point 440 as measured at various times 420 and locations 430 within the wireless network 200. The work station may access a geographic information system to generate a map 510 which presents the report using, for example, geographic forms laid out on a map of the metropolitan area. For example, colors or a region of shading may be used to indicate that quality of service coverage in a geographic area 520 is less than a certain threshold, such as might occur if an access point to the wireless network were unavailable.

Alternatively, colors or regions of shading may indicate a statistical aggregate of the quality of service coverage provided in the geographic area 520. For example, the color green may indicate that available capacity of the wireless network within the geographic area 520 exceeds 50% of a desired or expected value, the color yellow may indicate that the available capacity within the geographic area 520 is less than 50% of the value, and the color red may indicate that the available capacity within the geographic area 520 is less than 25% of the value.

Various types of reports may be generated using the work station. For example, the report 510 may indicate real-time quality of service coverage provided throughout wireless network 200 as reports are received, or the report may indicate mean service coverage provided throughout wireless network 200 over various periods of time, such as minute, hour, day, or week. Additionally, the work station may generate a series of reports 510 that may be displayed in sequence to illustrate how service coverage changes over periods of time, such as minute-by-minute, hour-by-hour, day-by-day, week-by-week, or year-by-year.

Figure 6:
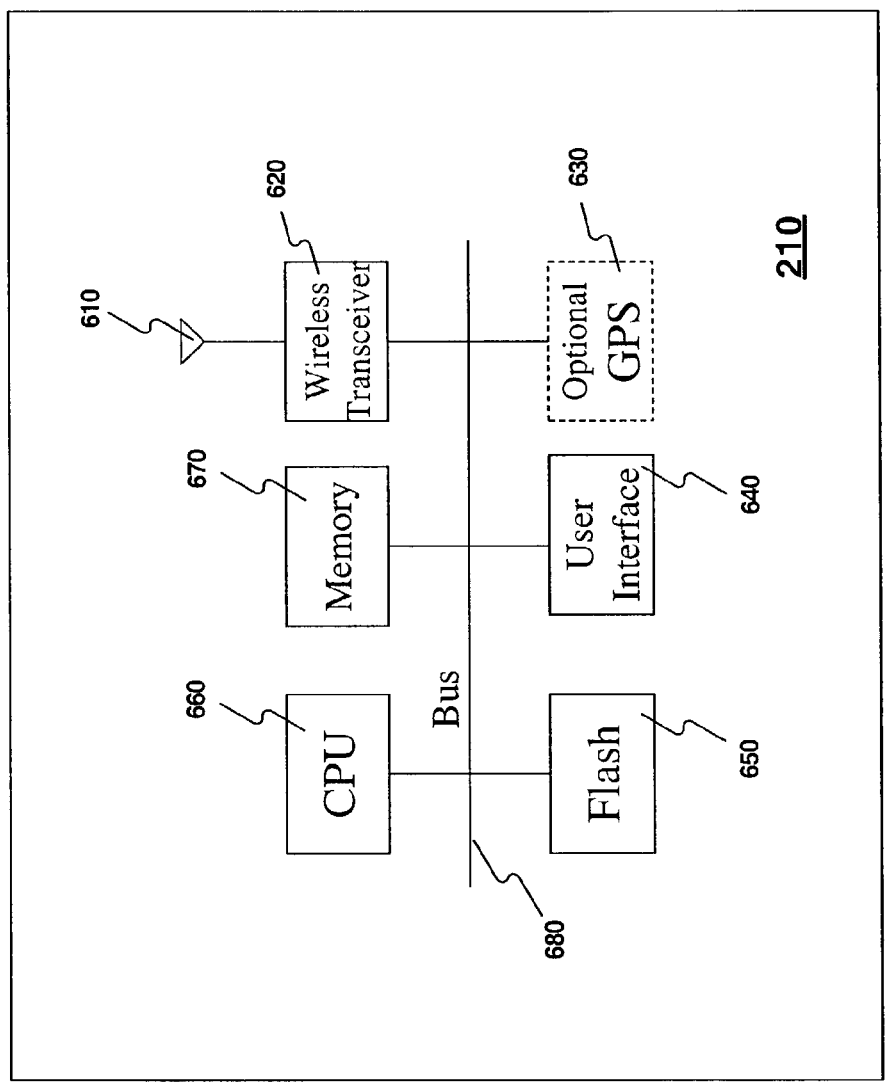
FIG. 6 shows an exemplary device for accessing the wireless network in accordance with methods and systems consistent with certain aspects related to the present invention.

FIG. 6 shows an exemplary wireless device 210 for accessing the wireless network in accordance with methods and systems consistent with the present invention. Wireless device 210 may include an antenna 610 electrically coupled to wireless transceiver 620. Wireless device 210 may optionally include location equipment 630, such as a GPS receiver, to determine its location. Optional location equipment 630 may be electrically coupled to the antenna 610 or may be electrically coupled to a second antenna (not shown). Wireless device 210 may include wireless transceiver 620, optional location equipment 630, user interface 640 (e.g., a keypad and a display), first memory 650 (e.g., flash memory), processor 660 (e.g., a digital signal processor), and a second memory 670 that are coupled to electrical bus 680.

Wireless device 210 may use first memory 650 to store information for relatively long periods of time and second memory 670 to store information for relatively short periods of time. For example, wireless device 210 may monitor the corresponding signal quality for one or more access points. If the signal quality is less than a desired or expected value, then wireless device 210 may store a time 420, a location 430, an identifier for access point 440 and the corresponding signal quality 450 in first memory 650. At a later time, when the signal quality exceeds the desired or expected value, wireless device 210 may transmit a message 300 to an access point 220y that includes time 420, location 430, identifier for the access point 440 and corresponding signal quality 450 that were stored in first memory 650. Such messages may be gathered in the database 230, and used to generate a report 510 illustrating dead zones within wireless network 200.

Therefore, methods and systems consistent with the present invention may be used with wireless devices 210, such as wireless Internet devices and cellular telephones, with or without an optional GPS receiver. Moreover, even though the examples in this disclosure refer to a metropolitan network, the methods and systems disclosed hereinabove are consistent with a wireless local area network (WLAN) having one or more access points 220. For example, the methods and systems disclosed are appropriate for wireless networks consistent with the IEEE 802.11 standard.

The above embodiments and other aspects and principles of the present invention may be implemented in various environments. Such environments and related applications may be specially constructed for performing the various processes and operations of the invention or they may include a general-purpose computer or computing platform selectively activated or reconfigured by program code to provide the necessary functionality. The processes disclosed herein are not inherently limited to implementation on any particular computer, apparatus, programming language, operating system, etc. and may be implemented by a suitable combination of hardware, software, and/or firmware. For example, various general-purpose machines may be used with programs written in accordance with teachings of the present invention, or it may be more convenient to construct a specialized apparatus or system to perform the required methods and techniques.

The present invention also relates to computer readable media that include program instructions or program code for performing various computer-implemented operations based on the methods and processes of the invention. The media and program instructions may be those specially designed and constructed for the purposes of the invention, or they may be of the kind well-known and available to those having skill in the relevant arts. Examples of program instructions include micro-code, machine code, such as produced by a compiler, and files containing a high-level code that may be executed by the computer using an interpreter, or other means.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for determining service coverage for a wireless network having a plurality of access points, said method comprising:

receiving information indicating a quality of service at least partially defining service coverage for the wireless network, wherein said information is received from at least one wireless device that has gathered the information while being communicatively coupled through at least one of said plurality of access points to the wireless network using a wireless communication channel, and wherein receiving information includes receiving previously measured information indicating the quality of service for a period of time during which the at least one wireless device measured a quality of service below a threshold, the previously measured information being received in response to the at least one wireless device measuring a current quality of service above the threshold;

gathering the received information in a database; and monitoring quality of service for the wireless network using the gathered information.

2. The method of claim 1, wherein said received information includes first information identifying at least one of said plurality of access points.

3. The method of claim 1, wherein said received information includes second information indicating quality of service of said wireless communication channel.

4. The method of claim 1, wherein said received information includes third information corresponding to a location of said at least one wireless device.

5. The method of claim 1, wherein said gathering further comprises:

updating the database with location information corresponding to one or more geographic locations associated with said at least one wireless device.

6. The method of claim 1, wherein said monitoring further comprises:

reporting said gathered quality of service information over a period of time.

7. The method of claim 1, wherein said monitoring further comprises:

reporting said gathered quality of service information defining service coverage corresponding to a geographic area.

8. The method of claim 1, wherein said reporting further comprises:

reporting said gathered quality of service information indicating a geographic area where quality of service is below a threshold.

9. A method for reporting service coverage for a wireless network having a plurality of access points, said method comprising:

determining information indicating a quality of service at least partially defining service coverage for the wireless network, wherein said information is gathered by at least one wireless device while being communicatively coupled to the wireless network through at least one of said plurality of access points using a wireless communication channel;

storing at least a portion of said information in a memory in response to said quality of service being below a threshold; and providing the stored portion of said information to at least one of said plurality of access points when said quality of service corresponding to said wireless communication channel returns to being above the threshold.

10. The method of claim 9, wherein said information includes a portion of information identifying at least one wireless access point for the wireless network.

11. The method of claim 9, wherein said information further includes a location of said at least one wireless device.

12. A system for determining service coverage for a wireless network having a plurality of access points, the system comprising:

means for receiving information indicating a quality of service at least partially defining service coverage for the wireless network, wherein the received information is received from at least one wireless device that has gathered the information while being communicatively coupled through at least one of said plurality of access points to the wireless network using a wireless communication channel, and wherein means for receiving information includes means for receiving previously measured information indicating the quality of service for a period of time during which the at least one wireless device measured a quality of service below a threshold, the previously measured information being received in response to the at least one wireless device measuring a current quality of service above the threshold;

means for gathering said received information in a database; and means for monitoring quality of service for the wireless network using the gathered information.

13. The system of claim 12, wherein said received information includes first information identifying at least one of said plurality of access points.

14. The system of claim 12, wherein said received information further includes second information indicating quality of service of said wireless communication channel.

15. The system of claim 12, wherein said received information further includes third information corresponding to a location of said at least one wireless device.

16. The system of claim 12, wherein said gathering means further comprises:

means for updating the database with location information corresponding to one or more geographic locations associated with said at least one wireless device.

17. The system of claim 12, wherein said monitoring means further comprises:

means for reporting said gathered information indicating quality of service over a period of time.

18. The system of claim 12, wherein said monitoring means further comprises:

means for reporting said gathered quality of service information defining service coverage corresponding to a geographical area.

19. An apparatus for reporting service coverage for a wireless network having a plurality of access points, said apparatus comprising:

means for determining information indicating a qualify of service at least partially defining service coverage for the wireless network, wherein the determined information is gathered by at least one wireless device while being communicatively coupled to the wireless network through at least one of said plurality of access points using a wireless communication channel:

means for storing the information in response to the quality of service being below a threshold; and means for communicating the stored information to at least one of the plurality of access points in response to the quality of service returning to being above the threshold.

20. The apparatus of claim 19, wherein said determining means further comprises:

means for identifying at least one of said plurality of access points of the wireless network.

21. The apparatus of claim 20, wherein said determining means further comprises:
  means for determining quality of the service of said wireless communication channel that communicatively couples said wireless device to the at least one of said plurality of access points.

22. The apparatus of claim 19, wherein said determining means further comprises:
  means for determining a geographic location of said wireless device.

23. A device comprising:
  a transceiver;
  means for determining position information for the device at a plurality of time increments;
  means for determining quality of service information associated with the device at certain of said time increments and associating the quality of service with position information for the device at each of said time increments, wherein the quality of service information at least partially defines service coverage for the wireless network;
  means for providing information reflecting the quality of service information to a base station based upon a condition;
  means for storing the quality of service information in a memory in response to the quality of service being below a threshold; and
  means for communicating the stored quality of service information to an access point of the wireless network in response to the quality of service returning to being above the threshold.

24. The device of claim 23, wherein said stored quality of service information includes a position of the device when the quality of service is below the threshold.

25. A device for operation in a wireless network comprising:
  means for simultaneously determining position information for the device and quality of service information associated therewith within a network; and
  means for providing the quality of service information at least partially defining service coverage for the wireless network to a work station based on a condition; and
  means for storing said quality of service information in a memory
  wherein said means for providing further comprises:
    means for storing quality of service information in response to said quality of service failing to meet a threshold; and
    means for providing the stored quality of service information to the work station when the quality of service returns to meeting the threshold.

* * * * *